United States Patent [19]

Dettinger

[11] Patent Number: 4,950,109
[45] Date of Patent: Aug. 21, 1990

[54] MILLING AND COUNTERSINKING FIXTURE

[75] Inventor: Heinrich Dettinger, Hanau, Fed. Rep. of Germany

[73] Assignee: Siemens Aktiengesellschaft, Munich, Fed. Rep. of Germany

[21] Appl. No.: 301,802

[22] Filed: Jan. 25, 1989

[30] Foreign Application Priority Data

Jan. 25, 1988 [DE] Fed. Rep. of Germany ... 8800840[U]

[51] Int. Cl.$^5$ .............................................. B23B 41/00
[52] U.S. Cl. ........................................ 408/82; 407/33; 407/47; 408/67; 408/130; 408/186; 408/233; 408/713
[58] Field of Search .................... 408/80–82, 408/83.5, 67, 130, 713, 233, 186; 407/33, 47, 48; 409/137, 175, 178; 82/113

[56] References Cited

U.S. PATENT DOCUMENTS

| | | | |
|---|---|---|---|
| 1,719,599 | 7/1929 | Dickson | 82/4 |
| 2,749,809 | 6/1956 | Anderson | 408/80 |
| 3,086,783 | 4/1963 | Kelso | 279/2 |
| 3,875,832 | 4/1975 | Mayfield | 82/113 |
| 4,231,690 | 11/1980 | Burns | 82/113 X |
| 4,555,833 | 12/1985 | Hawkins et al. | 408/130 X |

FOREIGN PATENT DOCUMENTS

| | | |
|---|---|---|
| 1948940 | 5/1971 | Fed. Rep. of Germany . |
| 2544237 | 10/1983 | France . |
| 8201838 | 6/1982 | PCT Int'l Appl. . |
| 946499 | 1/1964 | United Kingdom . |
| 2092934 | 8/1982 | United Kingdom . |

Primary Examiner—Steven C. Bishop
Attorney, Agent, or Firm—Herbert L. Lerner; Laurence A. Greenberg

[57] ABSTRACT

A milling and countersinking fixture for machining cylindrical openings includes a spindle head having a central opening formed therein and a tool holder disposed on the spindle head having an end surface and having a central opening formed therein defining an inner surface. A clamping mandrel is supported in the central opening formed in the spindle head and guided through the central opening formed in the tool holder. The tool holder has at least one recess formed therein having a given cross-sectional shape and is open only toward the end surface and toward the inner surface. At least one cutting body has a cross-sectional shape adapted to the given cross-sectional shape for insertion in the at least one recess.

11 Claims, 4 Drawing Sheets

MILLING AND COUNTERSINKING FIXTURE

The invention relates to a milling and countersinking fixture that can be used to machine cylindrical openings, especially in tube plate bores and pipe ends, in boiler and container construction.

In order to machine pipe ends, a milling fixture has already been used in which a clamping mandrel is threaded into the end of the pipe and fixed by spreading conical segments apart. In that structure, axial slits are provided in the cylindrical outer surface of the milling head, and cutting bodies in the form of cutting knives are inserted into these slits. The cutting knives are retained by clamping segments. The cutting knives must be adjusted separately, and additionally must all be adapted to the same cutting depth as one another.

It is accordingly an object of the invention to provide a milling and countersinking fixture, which overcomes the hereinafore-mentioned disadvantages of the heretofore-known devices of this general type, which does so in such a way that different countersunk shapes can be attained without necessitating adjustment of the various cutting bodies each time after insertion, and without the necessity of having to adapt them all to the same cutting depth when a plurality of cutting bodies are disposed in the tool holder.

With the foregoing and other objects in view there is provided, in accordance with the invention, a milling and countersinking fixture for machining cylindrical openings, in particular in tube plate bores and pipe ends, comprising:

(a) a spindle head having a central opening formed therein, a tool holder disposed on the spindle head having an end surface and having a central opening formed therein defining an inner surface;

(b) a clamping mandrel supported in the central opening formed in the spindle head and guided through the central opening formed in the tool holder;

(c) the tool holder having at least one recess formed therein having a given cross-sectional shape and being open only toward the end surface and toward the inner surface: and (d) at least one cutting body having a cross-sectional shape adapted to the given cross-sectional shape for insertion in the at least one recess.

In accordance with another feature of the invention, the at least one cutting body is in the form of at least two cutting bodies having additionally identical dimensions.

In this way, precise dimensions of the countersunk recess to be made can be predetermined by the cutting body, so that when the cutting body is assembled, tedious adjusting work becomes unnecessary and the assembly time can be shortened considerably.

In accordance with a further feature of the invention, the clamping mandrel has a taper formed therein in the vicinity of the at least one recess, and both the recess and the cutting body to be inserted into it are formed in such a way that the at least one cutting body protrudes into the taper. As a result, it is possible to machine a simple cylindrical or multi-step countersunk recess into the ends of pipes or in the vicinity of cylindrical openings, without the danger that the cutting body will break. With the prior art device, a countersunk recess of this type can only be made under certain conditions, because the cutting knife or knives would have to be long and thin.

In accordance with an added feature of the invention, the at least one recess is partly defined by lateral surfaces of the tool holder, and there is provided a clamping screw bracing the at least one cutting body against two of the lateral surfaces.

In accordance with an additional feature of the invention, there is provided an adjusting screw for adjusting the height of the at least one cutting body.

In accordance with yet another feature of the invention, the clamping mandrel includes a clamping sleeve and a clamping bolt longitudinally displaceable in the clamping sleeve, the clamping mandrel has an end in the form of a clamping finger to be fixed in the cylindrical opening to be machined, and the spindle head has an attachment piece, and there is provided a drive motor for driving the attachment piece.

In accordance with yet a further feature of the invention, the drive motor is connected to the attachment piece by a torque connection.

In accordance with yet an added feature of the invention, the spindle head is longitudinally displaceable on the clamping sleeve, and there is provided a pressure fluid drive having a piston connected to the clamping sleeve and a cylinder supported on the rotatable attachment piece of the spindle head.

In accordance with yet an additional feature of the invention, the drive motor is supported on the rotatable attachment piece of the spindle head, the spindle head has a gear ring, and there is provided gearing connected between the drive motor and the gear ring.

In accordance with still another feature of the invention, there is provided a pressure fluid drive having a piston connected to the clamping bolt and a cylinder disposed on the clamping sleeve.

In accordance with a concomitant feature of the invention, there is provided a chip collecting basket surrounding the tool holder.

Other features which are considered as characteristic for the invention are set forth in the appended claims.

Although the invention is illustrated and described herein as embodied in a milling and countersinking fixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
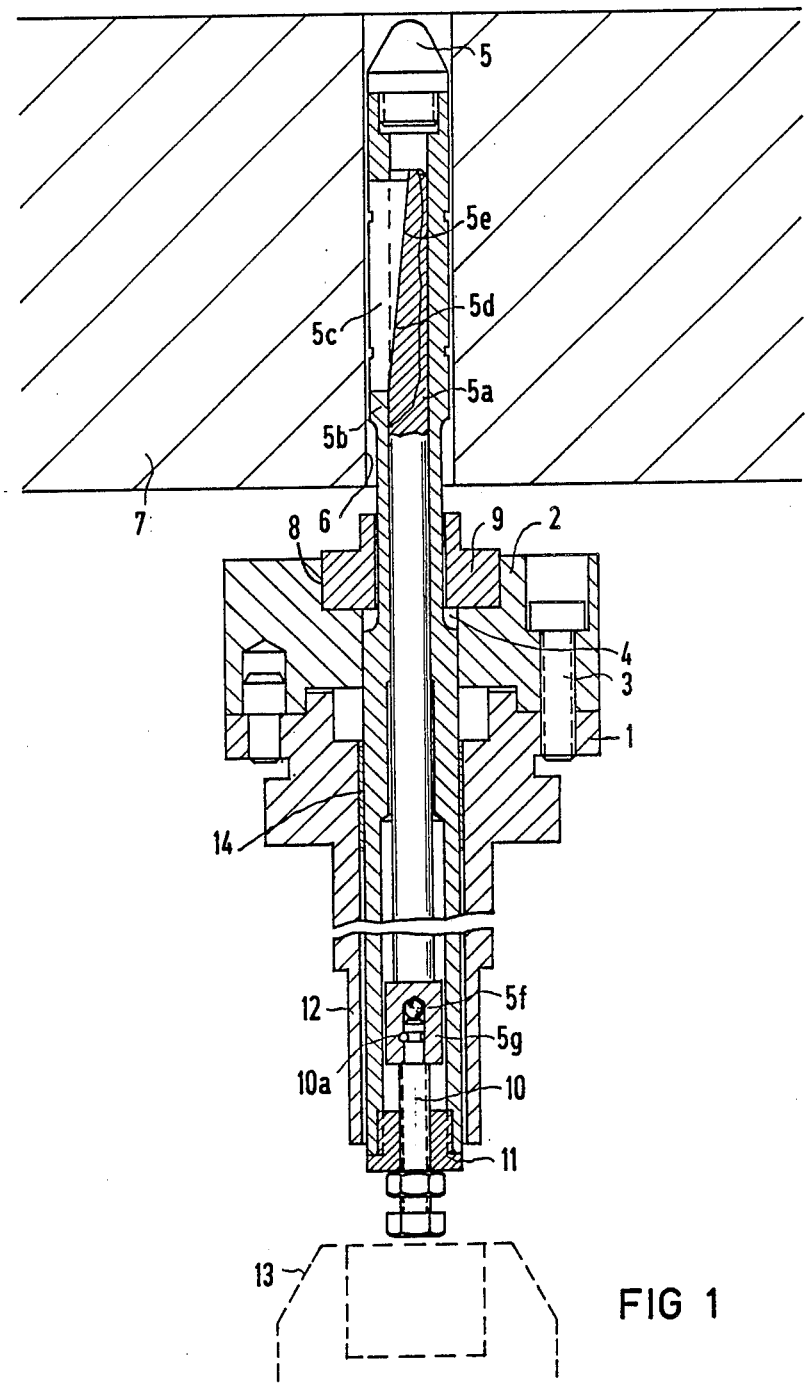
FIG. 1 is a fragmentary, diagrammatic, partially broken-away longitudinal-sectional view of a milling fixture for a cylindrical opening in a plate.

Referring now to the figures of the drawing in detail and first, particularly, to FIG. 1 thereof, there is seen a milling fixture for machining a cylindrical opening 6 in a plate 7. The milling fixture includes a spindle head 1 and a cylindrical tool holder 2 secured to the spindle head 1 with screws 3. A clamping mandrel 5 is supported in a central opening 4 in the spindle head 1 and is guided through a central opening in the tool holder 2. The clamping mandrel 5 includes a clamping bolt 5a, a clamping sleeve 5b and spreadable wedges 5c disposed in the clamping sleeve 5b and in the clamping bolt 5a. One end of the clamping bolt 5a along with the clamping sleeve 5b and the spreadable wedges 5c, forms a clamping finger that can be fixed in the cylindrical opening. The wedges are guided in grooves 5d in the clamping bolt 5a, which have a bottom surface 5e adapted to the wedge. The wedges protrude through slits in the clamping sleeve 5b. The end of the clamping bolt 5a opposite the clamping finger is supported on a screw 10 through a bearing 5g having a ball 5f. The screw 10 is disposed in a threaded bush 11 secured to the sleeve 5b and is retained on the clamping bolt 5a by means of a securing pin 10a. In this way, by rotating the screw 10, the clamping bolt 5a can be displaced longitudinally relative to the sleeve 5b, so that the wedges 5c are pressed outward against the cylindrical wall surface of the plate 7 and the clamping mandrel 5 is fixed in the cylindrical bore. The wedges 5c are released by turning the screw back in the other direction.

The spindle head 1 has an attachment piece 12 for a drive motor, in particular for a chuck 13 of a driving tool (such as an electric hand drill), which serves as the drive for the spindle head 1 in a simple manner. The drive motor 18 is connected to the attachment piece 12 by a torque connection. The attachment piece 12 is rotatably supported and guided on the clamping sleeve 5b through one or more bearing bushes 14.

In order to machine the cylindrical opening 6 in the plate 7, the clamping finger is threaded into the opening 6 and braced only to such an extent that displacement of the clamping mandrel 5 is still just barely possible upon fixation of the milling fixture.

Figure 2:
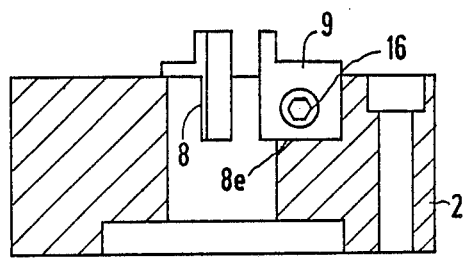
FIG. 2 is a sectional view of a tool holder of the milling fixture of FIG. 1.
Figure 3:
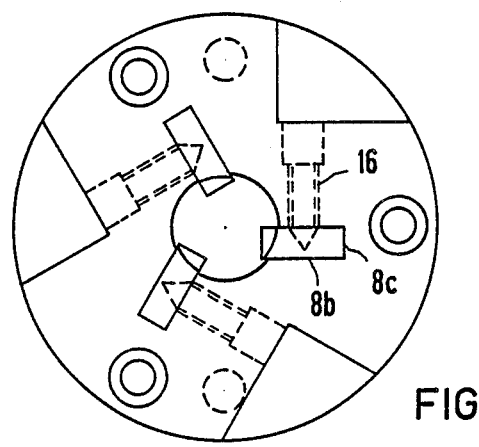
FIG. 3 is a plan view of the tool holder of FIG. 2.

As seen in FIGS. 2 and 3, three recesses which are defined by surfaces 8a–d and are provided in the tool holder 2, are open only toward the end surface and toward the inside and are intended for the insertion of cutting bodies 9. The clamping mandrel 5 has a taper formed therein in the vicinity of the recess 8 into which the cutting body 9 protrudes. The cross-sectional shapes of the recesses and the cutting body 9 are adapted to one another, and moreover the dimensions of the cutting bodies 9 are identical to one another. The bottom surface 8e of the recess, which is shaped in the form of a polyhedron, and two adjoining lateral surfaces 8b, 8c, serve as a stop for the cutting body, which has a rectangular bottom and is likewise in the form of a polyhedron.

As FIG. 3 shows, the cutting body 9 can be braced against the lateral surfaces 8b, 8c of the recess 8 by means of a clamping screw 16.

If a driving tool coupled to the attachment piece 12 is turned on, the spindle head 1 and the tool holder 2 along with the cutting body 9 execute a rotational motion about the clamping mandrel 5 resting in the cylindrical opening 6. If a longitudinal force is exerted upon the driving tool, then the clamping mandrel 5, which is only fixed in the opening 6, can be displaced and thus a feed movement for the cutting bodies 9 can be generated and a countersunk recess can be created in the opening 6 of the plate 7.

Figure 4:
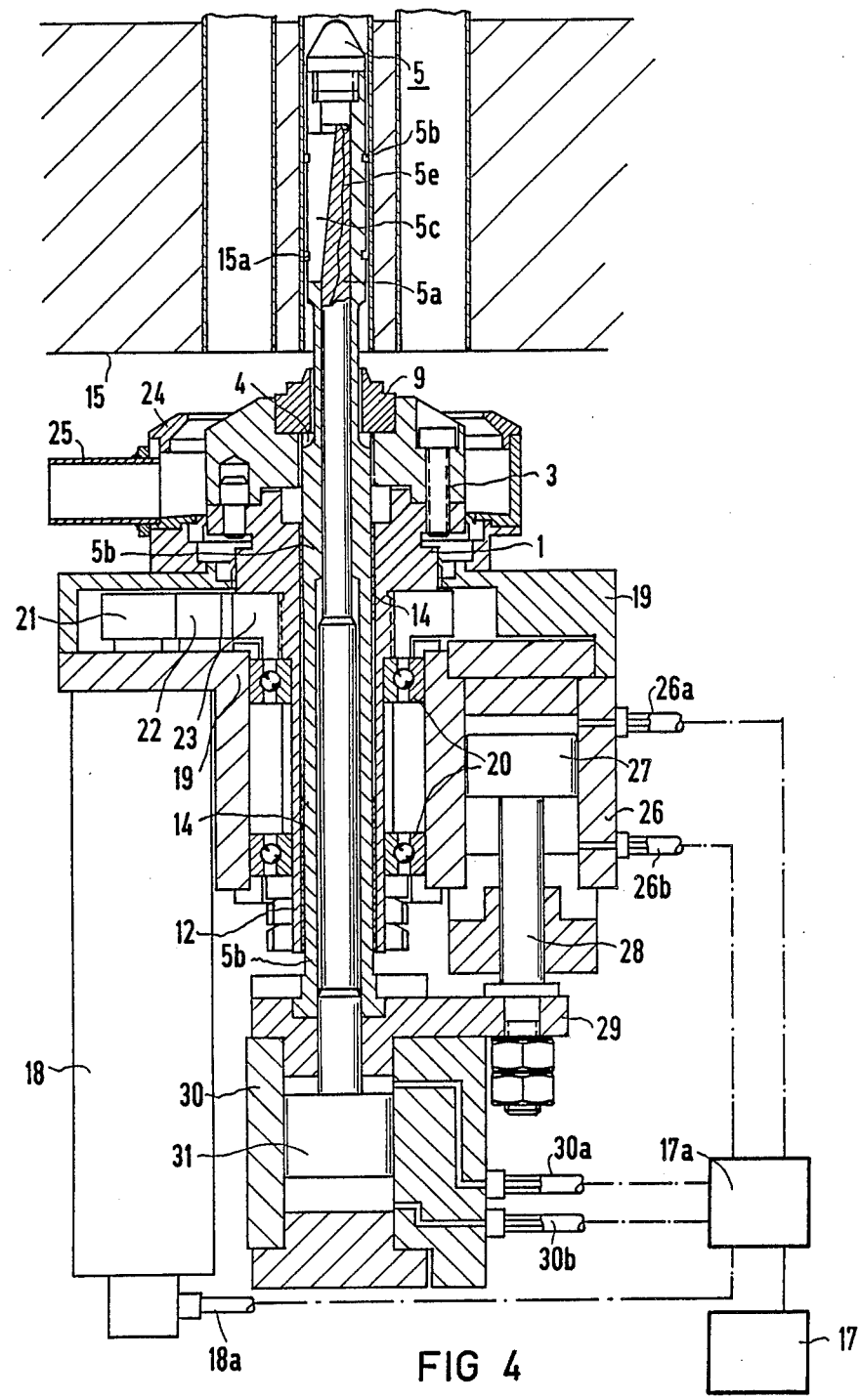
FIG. 4 is a view similar to FIG. 1 of a countersinking fixture for milling a multi-step countersunk recess into a pipe end, which discharges into a tube plate of a heat exchanger.

FIG. 4 shows a milling and countersinking fixture for machining the end of a pipe 15a, which is inserted into a tube plate 15 of a steam generator. The rotational motion of the cutting body 9 and the feed thereof are each generated by a respective pressure fluid drive. The spindle head 1, along with the tool holder 2 and the cutting body 9, is longitudinally displaceably supported on the sleeve 5b of the clamping mandrel 5, through bearing bushes 14. The tool holder 2 has chamfered end surfaces. The clamping mandrel 5 is guided in a central opening in the spindle head 1 through the bearing bushes 14. Spreadable wedges 5c are disposed in the clamping sleeve 5b and in the clamping bolt 5a, with the wedges being guided in grooves 5d having a bottom surface 5e adapted to a wedge and the spreadable wedges protrude through slits in the clamping sleeve 5b. A base plate 29 is disposed on the clamping sleeve 5b at the end of the clamping mandrel 5 opposite the clamping finger, and a cylinder 30 is secured to the base plate. Pressure fluid lines 30a, 30b lead to the cylinder 30 and communicate with a pressure reservoir 17 through a control unit 17a. A piston 31 disposed in the cylinder 30 is connected directly to the clamping bolt 5a. If hydraulic fluid is supplied to the cylinder 30 through the pressure fluid line 30b, the clamping bolt 5a is moved longitudinally, and the wedges 5c are pressed outward against the inside surface of the pipe 15a. During this process, such major clamping forces are exerted that the milling and countersinking fixture is anchored in the tube plate 15 through the clamping mandrel 5.

A drive motor 18 supplied from the pressure reservoir 17 is used to generate the rotational motion of the spindle head 1. The motor is in the form of a conventional pneumatic or hydraulic motor. The drive motor 18 is secured on a housing 19 of the milling and countersinking fixture, in which the spindle head 1 is supported by means of the tubular attachment 12 thereof through roller bearings 20. The shaft of the drive motor 18 has a pinion 21 inside the housing 19, which meshes with a gear wheel 22 that is connected by a torque connection to a gear ring 23 secured on the spindle head 1. The tool holder 2 is surrounded by a chip collecting basket 24 disposed on the housing 19, and a fitting 25 for removing chips is disposed on the basket.

In order to attain a feed movement of the spindle head 1 along with the tool holder 2 and the cutting body 9, a pressure-fluid-actuated cylinder 26 disposed on the housing 19 is supplied through lines 26a, 26b connected through the control unit 17a to the pressure reservoir 17. The cylinder 26 has a piston 27 with a piston rod 28 connected to the base plate 29 that is secured on the clamping sleeve 5b of the clamping mandrel 5.

If the line 26a is subjected to pressure fluid, then the cylinder 26, the housing 19 connected to the cylinder and therefore the attachment piece 12 supported in the housing along with the spindle head 1, are displaced longitudinally on the clamping mandrel 5, so that the cutting bodies 9 are positioned against the end of the pipe to be machined.

Figure 5:
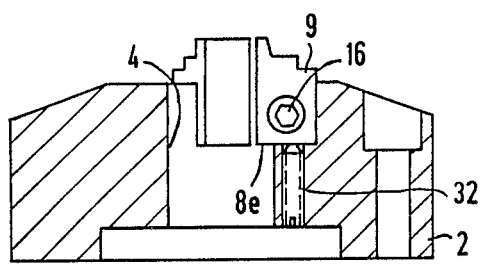
FIG. 5 is a sectional view of a tool holder with a cutting body of the milling fixture of FIG. 4.
Figure 6:
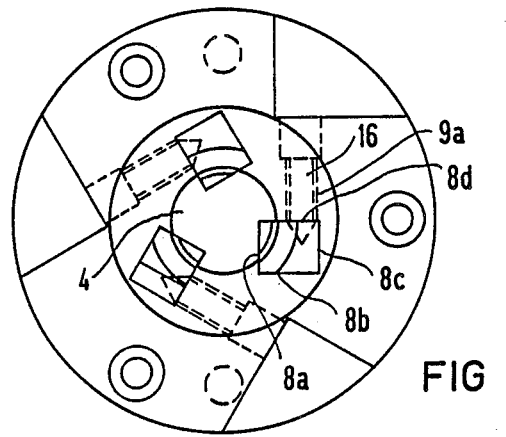
FIG. 6 is a plan view of FIG. 5.

The tool holder 2 is shown in FIGS. 5 and 6 as being provided with recesses for the insertion of cutting bodies 9 having a square bottom. The recesses are each defined by one square bottom surface 8e and four lateral surfaces 8a–8d. The lateral surfaces 8a and 8d are cut open by the cylindrical plane of the central opening. The cutting bodies 9 therefore protrude into the central opening 4. The cutting bodies are braced against the lateral surfaces 8b and 8c by clamping screws 16. In order to make it unnecessary to accurately finish the bottom 8e of the recess, it is preferable to perform a one-time adjustment of the height of the cutting bodies by means of an adjusting screw 32. The cutting bodies 9 have multi-step cutting edges and the first countersinking step has a chamfer.

I claim:

1. Milling and countersinking fixture for machining cylindrical openings, comprising:
   (a) a spindle head having a central opening formed therein, a tool holder disposed on said spindle head having an end surface and having a central cylindrical opening formed therein defining an inner surface;
   (b) a clamping mandrel supported in said central opening formed in said spindle head and guided through said central opening formed in said tool holder;
   (c) said tool holder having at least one recess formed therein having a given cross-sectional shape and being open only toward said end surface and toward said inner surface, said recess being defined by one substantially rectangular bottom surface and four lateral surfaces of said tool holder, and said central cylindrical opening formed in said tool holder passing through at least two of said lateral surfaces; and
   (d) at least one cutting body having a cross-sectional shape adapted to said given cross-sectional shape for insertion in said at least one recess.

2. Milling and countersinking fixture according to claim 1, wherein said at least one cutting body is in the form of at least two cutting bodies having additionally identical dimensions.

3. Milling and countersinking fixture for machining cylindrical openings, comprising:
   (a) a spindle head having a central opening formed therein, a tool holder disposed on said spindle head having an end surface and having a central opening formed therein defining an inner surface;
   (b) a clamping mandrel supported in said central opening formed in said spindle head and guided through said central opening formed in said tool holder;
   (c) said tool holder having at least one recess formed therein having a given cross-sectional shape and being open only toward said end surface and toward said inner surface; and
   (d) at least one cutting body having a cross-sectional shape adapted to said given cross-sectional shape for insertion in said at least one recess,
   said clamping mandrel having a taper formed therein in the vicinity of said at least one recess, and said at least one cutting body protruding into said taper.

4. Milling and countersinking fixture according to claim 1, including a clamping screw bracing said at least one cutting body against two of said lateral surfaces.

5. Milling and countersinking fixture according to claim 1, including an adjusting screw for adjusting the height of said at least one cutting body.

6. Milling and countersinking fixture according to claim 1, wherein said clamping mandrel includes a clamping sleeve and a clamping bolt longitudinally displaceable in said clamping sleeve, said clamping mandrel has an end in the form of a clamping finger to be fixed in the cylindrical opening to be machined, and said spindle head has an attachment piece, and including a drive motor for driving said attachment piece.

7. Milling and countersinking fixture according to claim 5, wherein said drive motor is connected to said attachment piece by a torque connection.

8. Milling and countersinking fixture according to claim 6, wherein said spindle head is longitudinally displaceable on said clamping sleeve, and including a housing in which said rotatable attachment piece is supported, and a pressure fluid drive having a piston connected to said clamping sleeve and a cylinder connected to said housing.

9. Milling and countersinking fixture according to claim 6, including a housing connected to said drive motor, said rotatable attachment piece of said spindle head being supported in said housing, said spindle head having a gear ring, and gearing connected between said drive motor and said gear ring.

10. Milling and countersinking fixture according to claim 6, including a pressure fluid drive having a piston connected to said clamping bolt and a cylinder disposed on said clamping sleeve.

11. Milling and countersinking fixture according to claim 1, including a chip collecting basket surrounding said tool holder.

* * * * *